(12) United States Patent
Labyedh et al.

(10) Patent No.: US 9,728,813 B2
(45) Date of Patent: Aug. 8, 2017

(54) METHOD FOR FABRICATING SOLID-STATE THIN FILM BATTERIES

(71) Applicants: IMEC VZW, Leuven (BE); Katholieke Universiteit Leuven, KU LEUVEN R&D, Leuven (BE)

(72) Inventors: Nouha Labyedh, Menzel Bouzelfa-Nabeul (TN); Alfonso Sepulveda Marquez, Saltillo (MX); Philippe Vereecken, Liege (BE)

(73) Assignees: IMEC VZW, Leuven (BE); Katholieke Universiteit Leuven, KU Leuven R&D, Leuven (BE)

( * ) Notice: Subject to any disclaimer, the term of this patent is extended or adjusted under 35 U.S.C. 154(b) by 0 days.

(21) Appl. No.: 15/146,714

(22) Filed: May 4, 2016

(65) Prior Publication Data
US 2016/0329603 A1 Nov. 10, 2016

(30) Foreign Application Priority Data
May 5, 2015 (EP) .................................. 15166443

(51) Int. Cl.
*H01M 4/04* (2006.01)
*H01M 10/0585* (2010.01)
(Continued)

(52) U.S. Cl.
CPC ..... *H01M 10/0585* (2013.01); *H01M 4/0404* (2013.01); *H01M 4/70* (2013.01); *H01M 10/049* (2013.01); *H01M 10/0525* (2013.01); *H01M 4/0421* (2013.01); *H01M 4/0471* (2013.01); *H01M 4/1391* (2013.01); *H01M 4/485* (2013.01); *H01M 4/505* (2013.01); *H01M 4/667* (2013.01); *H01M 10/0436* (2013.01); *H01M 2220/30* (2013.01); *H01M 2300/0071* (2013.01)

(58) Field of Classification Search
USPC ......................................................... 427/115
See application file for complete search history.

(56) References Cited

U.S. PATENT DOCUMENTS

| 2010/0193365 | A1* | 8/2010 | Lopatin | ..................... | C25D 3/38 |
| | | | | | 205/111 |
| 2013/0017340 | A1* | 1/2013 | Brown | ................ | H01M 4/0404 |
| | | | | | 427/458 |

(Continued)

*Primary Examiner* — Brian K Talbot
(74) *Attorney, Agent, or Firm* — McDonnell Boehnen Hulbert & Berghoff LLP

(57) ABSTRACT

A method is provided for fabricating a thin film solid-state Li-ion battery comprising a first electrode layer, a solid electrolyte layer, and a second electrode layer. The method comprises depositing, on a substrate, an initial layer stack comprising a first layer comprising a first electrode material compound, and a second layer comprising an electrolyte material compound; and afterwards performing a lithiation step comprising incorporating Li in the first layer and in the second layer, thereby forming a stack of a first electrode layer and a solid electrolyte layer. The initial layer stack may further comprise a third layer comprising a second electrode material compound. By performing the lithiation step, Li is also incorporated in the third layer, such that a stack of a first electrode layer, a solid electrolyte layer, and a second electrode layer is formed. One or more of the first, second, or third layers may be Li-free.

12 Claims, 5 Drawing Sheets

(51) Int. Cl.
*H01M 10/0525* (2010.01)
*H01M 4/70* (2006.01)
H01M 4/1391 (2010.01)
H01M 4/485 (2010.01)
H01M 4/505 (2010.01)
H01M 4/66 (2006.01)
H01M 10/04 (2006.01)

(56) References Cited

U.S. PATENT DOCUMENTS

| | | | |
|---|---|---|---|
| 2014/0170476 A1* | 6/2014 | Tan | H01M 4/131 |
| | | | 429/188 |
| 2015/0064568 A1* | 3/2015 | Yushin | H01M 10/0525 |
| | | | 429/233 |
| 2015/0333385 A1* | 11/2015 | Sun | H01M 4/366 |
| | | | 429/405 |
| 2016/0181594 A1* | 6/2016 | Balogh | H01M 4/1393 |
| | | | 156/247 |

* cited by examiner

METHOD FOR FABRICATING SOLID-STATE THIN FILM BATTERIES

CROSS-REFERENCE TO RELATED APPLICATION

The present application is a non-provisional patent application claiming priority to European Patent Application No. 15166443.0 filed on May 5, 2015, the contents of which are hereby incorporated by reference

FIELD

The present disclosure is related to methods for fabricating solid-state thin film battery half-cells and cells, such as solid-state thin film Li-ion battery half-cells and cells.

BACKGROUND

Thin film batteries, such as thin film Li-ion batteries, in particular solid-state thin film Li-ion batteries, are gaining more and more interest. A thin film battery is composed of several electrochemical cells that are connected in series and/or in parallel to provide the required voltage and capacity. A battery cell is mainly composed of a cathode electrode and an anode electrode separated by an electrolyte, which enables ion transfer between the two electrodes.

For the fabrication of thin film batteries, several methods may be used, for example physical vapor deposition processes such as sputtering, or solution based processes such as sol-gel processes. The different components (anode, electrolyte, and cathode) of such batteries are typically prepared separately, for example by hydrothermal powder synthesis. Complex compounds may be prepared by ball milling induced solid-state reaction. Such methods involve time-consuming processes. Several heating treatments are needed to obtain the desired material precursors in a powder-like form. These precursors are the basis for creating the separate components of the battery. Additional process steps such as dispersion, mixing and/or drying are needed to obtain mixed powders with a targeted stoichiometric composition.

One of the obstacles for the implementation of Li-ion based batteries in portable consumer electronics is the lack of process compatibility with CMOS processing. Generally, the presence of Li containing species inside CMOS processing facilities poses contamination issues.

SUMMARY

The present disclosure provides a method for the fabrication of solid-state thin film battery half-cells and cells, such as solid-state thin film Li-ion battery half-cells and cells, wherein the fabrication method is relatively less complex and time consuming than known fabrication processes.

The present disclosure further provides a method for the fabrication of solid-state thin film Li-ion battery half-cells and cells, wherein the fabrication method is compatible with silicon processing, e.g. CMOS processing.

The disclosure is related to a method for fabricating a thin film solid-state Li-ion battery comprising a first electrode layer, a solid electrolyte layer, and a second electrode layer. The method of the present disclosure comprises depositing on a substrate an initial layer stack comprising a first Li-free layer comprising a first electrode material compound, and a second Li-free layer comprising an electrolyte material compound, and afterwards performing a lithiation step of process. The lithiation step comprises incorporating Li in the first layer and in the second layer, thereby forming a battery half-cell stack of a first electrode layer and a solid electrolyte layer.

The initial layer stack may further comprise a third Li-free layer comprising a second electrode material compound. Performing the lithiation step then further comprises incorporating Li in the third layer and transforming it into a second electrode layer, thereby forming a battery cell stack of a first electrode layer, a solid electrolyte layer, and a second electrode layer.

In embodiments of the present disclosure, the first Li-free layer and/or the second Li-free layer and/or the third Li-free layer may comprise a stack of two or more sub-layers.

Performing the lithiation step may for example comprise depositing a layer comprising a Li compound on the initial layer stack and afterwards performing a thermal treatment, thereby inducing a solid-state reaction between the Li compound and the material compounds of the Li-free layers of the initial layer stack. The layer comprising the Li compound may for example be a $Li_2O$ layer, a $Li_2CO_3$ layer, or a Li metal layer, the present disclosure not being limited thereto. It may for example be provided by solution processing, such as for example by spin coating, or it may be provided by other methods such as for example by Atomic Layer Deposition (ALD) or by Physical Vapor Deposition (PVD).

The substrate may comprise a current collector, e.g., the initial layer stack may be deposited on a current collector. The current collector may for example comprise TiN, Pt, or Ni, the present disclosure not being limited thereto.

The substrate may be a planar substrate or it may be a non-planar substrate. For example, a non-planar substrate may comprise a plurality of 3D features or 3D microstructures, such as for example a plurality of micro-pillars. For example, the substrate may comprise an array of high aspect-ratio pillars, such as for example silicon pillars, e.g. silicon pillars coated with a current collector layer. The pillars may for example have a diameter in the range between 0.5 micrometers and 10 micrometers, a spacing of 1 micrometer to 20 micrometers, and a height in the range between 10 micrometers and 200 micrometers, the present disclosure not being limited thereto. A potential advantage of using a substrate comprising a plurality of 3D microstructures is an increased battery capacity.

In embodiments of the present disclosure, the initial layer stack may be Li-free. In such embodiments, the second Li-free layer is deposited on the first Li-free layer, such as in direct physical contact with the first Li-free layer. In such embodiments, the third Li-free layer is deposited on the second Li-free layer, for instance, in direct physical contact with the second Li-free layer.

In embodiments of the present disclosure, a layer comprising a Li compound may be incorporated in the initial layer stack. For example, a layer comprising a Li compound, such as a $Li_2O$ layer or a $Li_2CO_3$ layer, may be present in the initial layer stack between the first Li-free layer and the second Li-free layer. For example, a layer comprising a Li compound, such as a $Li_2O$ layer or a $Li_2CO_3$ layer, may be present in the initial layer stack between the second Li-free layer and the third Li-free layer.

A potential advantage of a method of the present disclosure is that the number of process steps for making a battery half-cell or a battery cell may be reduced as compared to known methods. For example, a fabrication process of a battery half-cell or a battery cell in accordance with a method of the present disclosure may require only a single annealing step or heating treatment. Further, the preparation of the material compounds of the electrodes and the electrolyte layer is less complex and less time consuming as compared to known approaches wherein the different components are prepared separately, for example, by powder synthesis.

A potential advantage of embodiments of the present disclosure is that the method may be compatible with CMOS processing. More in particular, in embodiments wherein the initial layer stack is Li-free, the initial layer stack may be deposited in a silicon or CMOS processing environment without the risk of Li contamination. A potential advantage of depositing the initial layer stack in a silicon or CMOS processing environment is that it enables depositing uniform thin film layers of good quality, e.g., thin film layers with a well-controlled and uniform thickness and with a well-controlled composition, using well-established microelectronic processes. This opens the route for high-throughput fabrication of thin film battery half-cells or thin film battery cells in a CMOS processing environment. Only after deposition of the initial layer stack, at the point where Li needs to be introduced, the device is further processed outside the silicon or CMOS processing environment (post-deposition lithiation).

A potential advantage of a method of the present disclosure is that thin films having a thickness in the order of a few nanometers or a few tens of nanometers can be used. This is substantially thinner than the film thicknesses in the order of micrometers used in known methods. A potential advantage of using thinner layers is that the length of diffusion paths for Li-ions is reduced, which may lead to an enhanced cyclic performance of the batteries.

An additional potential advantage of using thinner films or layers as compared to existing solid-state batteries is that the amount of material used may be reduced, which can have a significant effect on the overall cost of thin film batteries.

In a method of the present disclosure, low-cost deposition processes, such as for example spin coating, electrochemical deposition or evaporation, can be used for providing the layers of the layer stack. A potential advantage of using low-cost deposition processes is that the overall battery cost is reduced.

In known methods for fabricating solid-state batteries, first the different materials for the electrodes and the electrolyte are prepared in a powder form. Such processes typically include potentially hazardous materials. A potential advantage of a method according to the present disclosure is that safety risks during preparation are minimized substantially.

Certain objects and advantages of various inventive aspects have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Figure 1A:
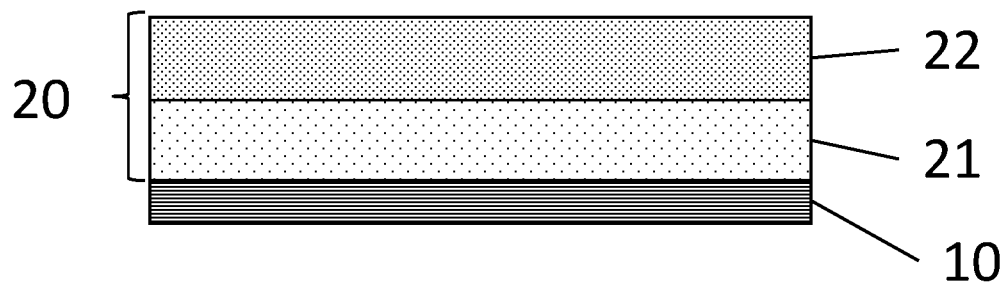
FIGS. 1a-1c and FIG. 2 schematically illustrate a method according to the present disclosure for fabricating a solid-state thin film battery half-cell.

Any reference signs in the claims shall not be construed as limiting the scope of the present disclosure.

In the different drawings, the same reference signs refer to the same or analogous elements.

DETAILED DESCRIPTION

In the following detailed description, numerous specific details are set forth in order to provide a thorough understanding of the disclosure and how it may be practiced in particular embodiments. However, it will be understood that the present disclosure may be practiced without these specific details. In other instances, well-known methods, procedures and techniques have not been described in detail, so as not to obscure the present disclosure.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

The term "comprising", used in the claims, should not be interpreted as being restricted to the means listed thereafter; it does not exclude other elements or steps. It should be interpreted as specifying the presence of the stated features, integers, steps, or components as referred to, but does not preclude the presence or addition of one or more other features, integers, steps or components, or groups thereof. Thus, the scope of the expression "a device comprising components A and B" should not be limited to devices consisting only of components A and B.

In the context of the present disclosure, a battery half-cell is a structure comprising a single electrode layer and an electrolyte layer, for example an anode layer and an electrolyte layer or a cathode layer and an electrolyte layer.

In the contact of the present disclosure, a battery cell is a structure comprising two electrode layers with an electrolyte layer in between, e.g., a structure comprising an anode layer/electrolyte layer/cathode layer stack.

A method is provided for fabricating a thin film solid-state Li-ion battery half-cell comprising a first electrode layer and a solid electrolyte layer. In a method of the present disclosure, first an initial layer stack is deposited on a substrate, the initial layer stack comprising a first Li-free layer comprising a first electrode material compound, and a second Li-free layer comprising an electrolyte material compound. Afterwards, a lithiation step is performed, thereby incorporating Li in the first layer and in the second layer, and thereby forming a battery half-cell stack of a first electrode layer and a solid electrolyte layer.

Further, a method is provided for fabricating a thin film solid-state Li-ion battery cell comprising a first electrode layer, a solid electrolyte layer, and a second electrode layer. As compared to the method for fabricating a battery half-cell, in a method for forming a battery cell the initial layer stack deposited on the substrate further comprises a third Li-free layer comprising a second electrode material compound. Performing the lithiation step then further comprises incorporating Li in the third layer, thereby transforming the third layer into a second electrode layer. Performing the lithiation step then results in the formation of a battery cell stack of a first electrode layer, a solid electrolyte layer, and a second electrode layer. The solid electrolyte layer in this stack is sandwiched between the first electrode layer and the second electrode layer.

The lithiation step may for example comprise depositing on the initial layer stack a layer comprising a Li compound and next performing an annealing step to induce a solid-state reaction between the Li compound and the compounds present in the layers of the initial layer stack. The annealing temperature and the duration of the annealing step depend on the materials used and can be experimentally determined. The annealing temperature may for example be in the range between 400° C. and 800° C. The duration of the annealing step may for example be in the range between a few minutes and several hours, for example in the range between 5 minutes and 10 hours, or between 10 minutes and 4 hours, the present disclosure not being limited thereto.

In embodiments of the present disclosure the entire initial layer stack may be Li-free. In other embodiments a layer comprising a Li compound may be incorporated in the initial layer stack, such as for example between the first Li-free layer and the second Li-free layer and/or between the second Li-free layer and the third Li-free layer if present.

Using a method of the present disclosure, Li-ion micro-battery half-cells and full-cell stacks can be made, wherein the different layers have a thin film structure of a few nanometers or a few tens of nanometers thick, the present disclosure not being limited thereto.

Low-cost deposition techniques can be used to provide the layers of the layer stack, such as for example electrochemical deposition, spin coating or evaporation, the present disclosure not being limited thereto.

A method in accordance with the present disclosure may offer a route for electrode/electrolyte interface optimization. For example, annealing conditions may be selected to create electrolyte materials with a spinel structure. Combining such spinel electrolyte material with a spinel-type electrode material (such as Lithium manganese oxide (LMO) or lithium titanium oxide (LTO)) may result in an all-spinel solid-state battery with low interfacial resistance and an enhanced ionic conductivity. A method of the present disclosure may thus lead to a solid-state battery with an increased ionic conductivity, by controlling the crystal lattice of the materials through specific annealing treatments.

Figure 1B:
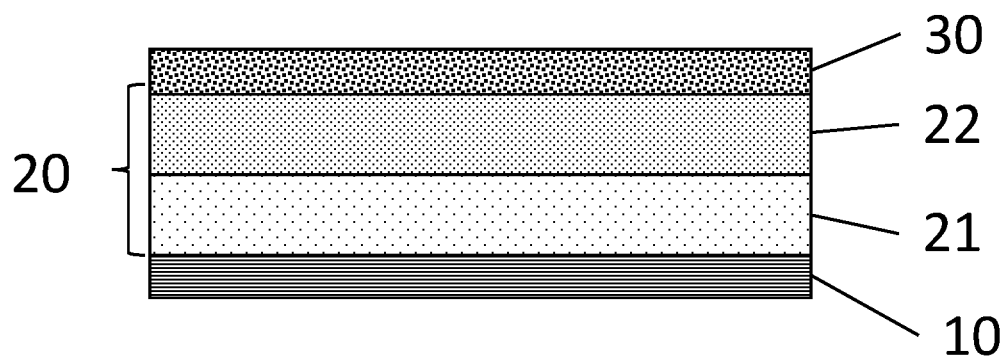
Figure 1C:
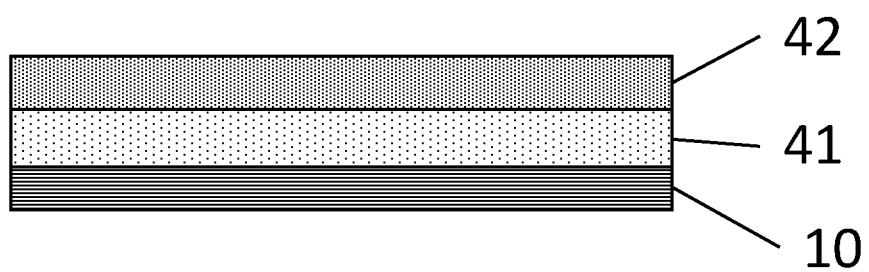
Figure 2:
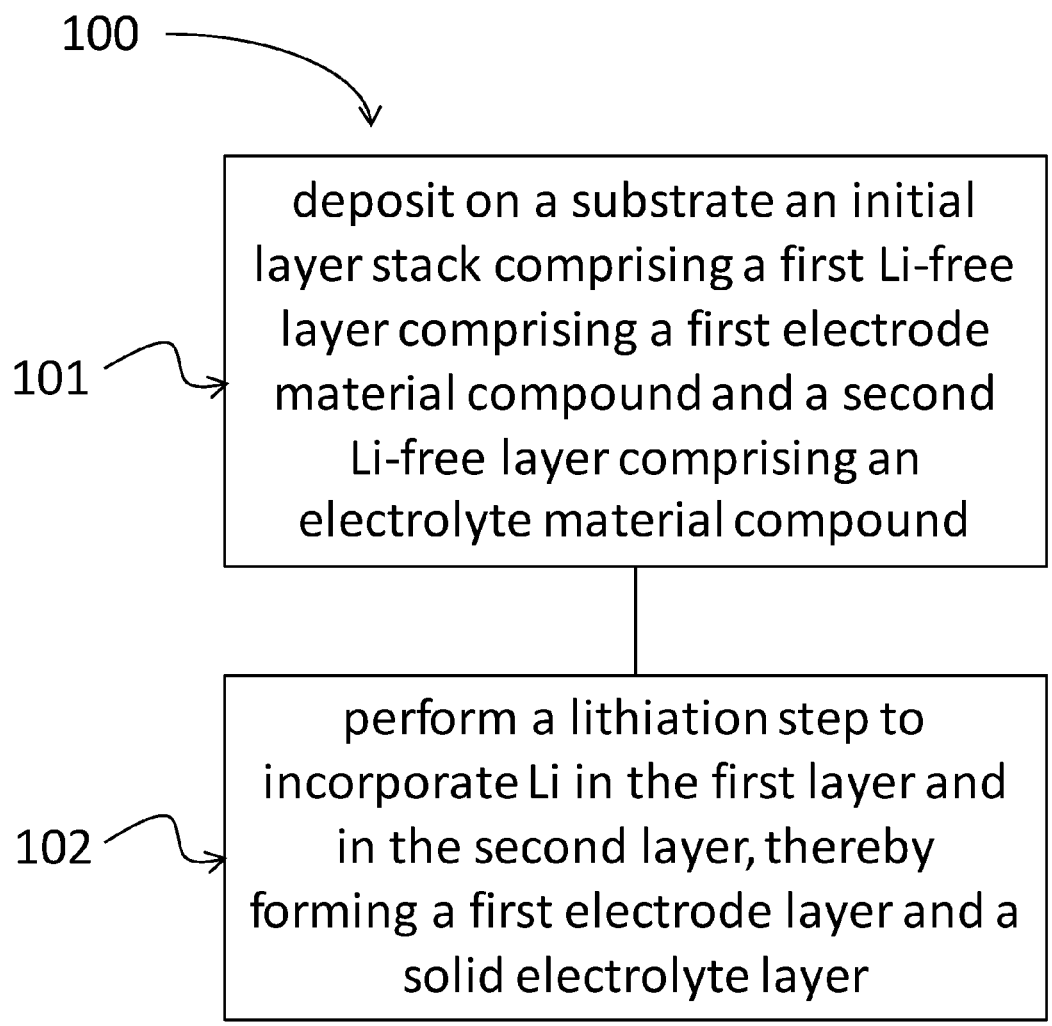

FIG. 1 and FIG. 2 schematically illustrate a method according to the present disclosure for fabricating a solid-state thin film battery half-cell. In the example shown in FIG. 1 the layer stack is a Li-free stack.

In a method 100 of the present disclosure, first an initial layer stack 20 is deposited on a substrate 10 (FIG. 1(a) and FIG. 2 block 101), the initial layer stack 20 being Li-free in the example shown in FIG. 1. The Li-free layer stack 20 comprises a first Li-free layer 21 comprising a first electrode material compound, and a second Li-free layer 22 comprising an electrolyte material compound. The first electrode material compound may for example be an oxide, e.g. a metal oxide, the present disclosure not being limited thereto. The first electrode material compound preferably has a good electronic conductivity, is chemically stable, and has a negligible volume expansion during battery charging/discharging. The electrolyte material compound may for example be an oxide such as a tantalum oxide, an aluminum oxide or a silicon oxide, the present disclosure not being limited thereto. The substrate 10 may for example comprise a current collector.

The first Li-free layer 21 and the second Li-free layer 22 typically have a thickness in the range between 5 nm and 250 nm, e.g., between 20 nm and 150 nm, the present disclosure not being limited thereto. The first Li-free layer 21 and/or the second Li-free layer 22 may be composed of different sub-layers, for instance, they may comprise a stack of different sub-layers.

The first Li-free layer 21 comprises a first electrode material compound, the first electrode material compound being a starting material for forming a first electrode layer (by lithiation) further in the fabrication process. The composition of the first Li-free layer 21 is thus different from the composition of the first electrode layer in the battery half-cell. Similarly, the second Li-free layer 22 comprises an electrolyte material compound, the electrolyte material compound being a starting material for forming a solid electrolyte layer (by lithiation) further in the fabrication process. The composition of the second Li-free layer 21 is thus different from the composition of the solid electrolyte layer in the battery half-cell.

After providing the initial layer stack 20, a lithiation step or process 102 (FIG. 2) is performed. The lithiation step 102 comprises depositing on the Li-free layer stack 20 a layer 30 comprising a Li compound as illustrated in FIG. 1(b), and afterwards performing an annealing or thermal treatment process or step. The annealing step induces a solid-state reaction between the Li compound and the material compounds (such as the first electrode material compound and the electrolyte material compound) of the layer stack 20. As a result of this single thermal treatment step, a stack comprising an electrode layer 41 and an electrolyte layer 42 is created, as illustrated in FIG. 1(c), suitable as a half-cell for solid-state thin film battery applications. Eventually, non-reacted material of the Li compound may be rinsed off.

In a method of the present disclosure, Titanium Oxide or Manganese Oxide may for example be used as a first electrode material compound. For example, a γ-$MnO_2$ layer (first Li-free layer 21) may be provided by electrochemical deposition as part of the initial layer stack 20. By performing a lithiation step 102, the $MnO_2$ layer 21 is transformed into a $LiMn_2O_4$ layer 41 suitable for use as a cathode layer in a solid-state battery (half-)cell.

In a method of the present disclosure, $Ta_2O_5$ may for example be used as an electrolyte material compound. For example, an evaporation process may be used to provide a thin layer of $Ta_2O_5$ (second Li-free-layer 22) as part of the initial layer stack 20. By performing a lithiation step 102, the $Ta_2O_5$ layer 22 is transformed into a $LiTaO_3$ layer 42 suitable for use as a solid electrolyte layer in a solid-state battery (half-)cell.

In a method of the present disclosure, the second Li-free layer 22 may comprise a stack of sub-layers. For example, a stack comprising an $Al_2O_3$ layer and a $SiO_2$ layer may be evaporated to form a second Li-free layer 22 as part of the initial layer stack 20. By performing a lithiation step 102, the second Li-free layer 22 comprising the $Al_2O_3$ layer and the $SiO_2$ layer is converted into a $Li_{4-2x}Al_xSiO_4$ layer suitable for use as a solid electrolyte layer in a solid-state battery half-cell and/or cell. For example, a stack of a Ni layer, a Ge layer, and a Ni layer may be evaporated to form a second Li-free layer 22 as part of the initial layer stack 20. By performing a lithiation step 102, the second Li-free layer 22 comprising the Ge and Ni layers is converted into a $Li_2NiGe_3O_8$ layer suitable for use as a solid electrolyte layer in a solid-state battery half-cell and/or cell.

In a method of the present disclosure, a Li compound is needed for performing the lithiation step in order to be able to transform, for example, $\gamma$-$MnO_2$ into $LiMn_2O_4$, $Ta_2O_5$ into $LiTaO_3$, and/or $Al_2O_3/SiO_2$ into $Li_{4-2x}Al_xSiO_4$ via a solid-state reaction. For example, a layer 30 comprising a Li compound is deposited on the initial layer stack 20 as illustrated in FIG. 1(b). The Li containing layer 30 may for example be a $LiO_2$ layer or a $Li_2CO_3$ layer. A $LiO_2$ layer may for example be formed by electro-precipitation, which is a low-cost deposition technique, the present disclosure not being limited thereto. Another low-cost method that may be used to deposit a Li containing layer 30 is spin casting. For example, a $Li_2CO_3$ layer may be deposited using spin coating of a water based Li precursor.

Experiments were performed related to the individual formation of thin film electrolyte layers and thin film electrode layers, based on a solid-state reaction process. For example, $LiTaO_3$ and $Li_{4-2x}Al_xSiO_4$ solid electrolyte layers were formed by a solid-state reaction process, and the formation of $Li_4Ti_5O_{12}$ by such process had been studied. These experiments on individual solid-state reactions were performed to optimize process parameter conditions, such as for example layer thicknesses, temperatures, and annealing times, as a basis for the incorporation of additional materials into multiple layer stacks 20 according to the present disclosure.

For example, experiments were performed wherein solid electrolyte layers were fabricated by depositing on a substrate a Li-free layer comprising an electrolyte material compound and a Li containing layer on top of the Li-free layer, followed by a thermal treatment to form the solid electrolyte layer.

A 40 nm thick layer of $Ta_2O_5$ was thermally evaporated on a $Si/SiO_2/TiN/Pt$ substrate. On top of the $Ta_2O_5$ layer a 34 nm thick $Li_2CO_3$ layer was provided by spin coating. Next the stack was annealed for 20 minutes in air. Different annealing temperatures (450° C., 550° C. and 750° C.) were used for different samples. Measured XRD patterns shown that a pure phase and crystalline $LiTaO_3$ layer is formed after a thermal treatment at 550° C. and at 750° C. The sample annealed at 450° C. did not show any $LiTaO_3$ diffraction peak, indicating that the material is amorphous. For the layer annealed at 450° C. the best ionic conductivity (2 $10^{-9}$ S/cm) was obtained.

In another experiment, a 25 nm thick $Al_2O_3$ layer was deposited by Atomic Layer Deposition on a $Si/SiO_2/TiN/Pt$ substrate. On top of the $Al_2O_3$ layer a 10 nm thick layer of $SiO_2$ was deposited by sputtering, followed by spin-coating of a 34 nm thick $Li_2CO_3$ layer on top of the $SiO_2$ layer. Next, the sample was annealed at 750° C. in air. Different annealing times (20 minutes, 120 minutes, and 600 minutes, for instance) were used for different samples, resulting in the formation of a $Li_{4-2x}Al_xSiO_4$ crystalline phase. The best results were obtained for the sample annealed for 120 minutes. For this sample an ionic conductivity of 7.3 $10^{-11}$ S/cm was obtained.

Using a method of the present disclosure, a battery half-cell or a battery cell may be fabricated using a single lithiation step.

For example, a half-cell comprising a $LiMn_2O_4$ cathode layer and a $LiTaO_3$ electrolyte layer may be formed by depositing (FIG. 2, step 101) a Li-free initial layer stack 20 comprising a $MnO_2$ layer (first Li-free layer 21) and a $Ta_2O_5$ layer (second Li-free layer 22) and next performing a lithiation step (FIG. 2, step 102) by depositing a $Li_2O$ or $Li_2Co_3$ layer (layer 30 comprising a Li compound) on the Li-free layer stack 20, followed by a single thermal treatment to induce a solid-state reaction.

Figure 5A:
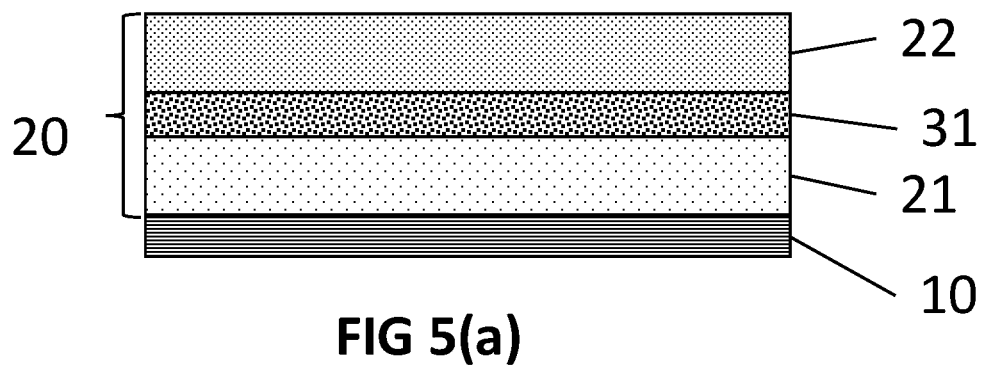
FIGS. 5a-5c schematically illustrates a method according to the present disclosure for fabricating a solid-state thin film battery half-cell.
Figure 5B:
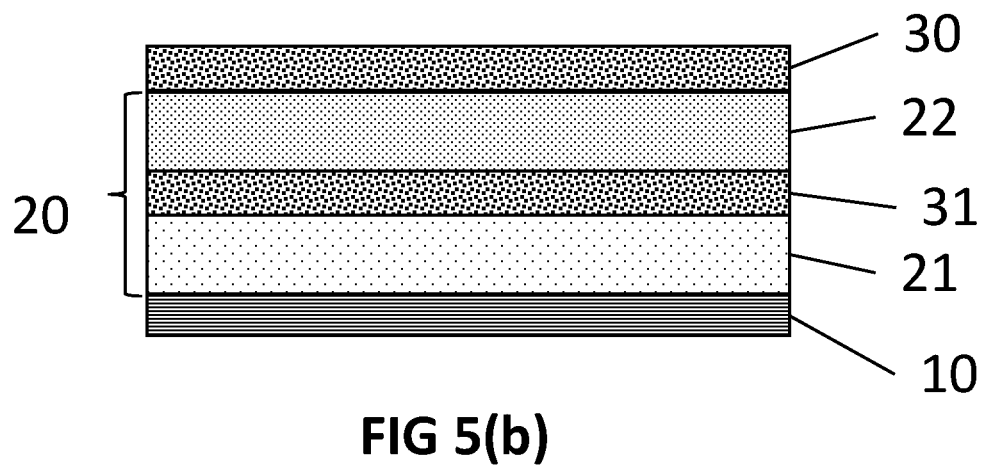
Figure 5C:
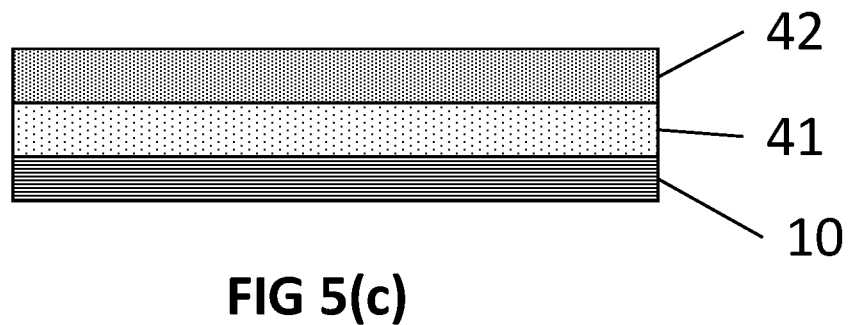

In an alternative approach, illustrated in FIG. 5, a layer 31 comprising a Li compound may be incorporated in the initial layer stack 20. For example, a half-cell comprising a $LiMn_2O_4$ cathode layer and a $LiTaO_3$ electrolyte layer may be formed by depositing (FIG. 2, step 101) an initial layer stack 20 comprising a $MnO_2$ layer (first Li-free layer 21), a layer 31 comprising a Li compound, and a $Ta_2O_5$ layer (second Li-free layer 22), as illustrated in FIG. 5(a), and next performing a lithiation step (FIG. 2, step 102) by depositing an additional $Li_2O$ or $Li_2Co_3$ layer (layer 30 comprising a Li compound, FIG. 5(b)) on the initial layer stack 20, followed by a single thermal treatment to induce a solid-state reaction. This single thermal treatment results in the formation of a battery half-cell stack comprising an electrode layer 41 and an electrolyte layer 42 as shown in FIG. 5(c).

Experiments were performed, wherein an initial layer stack 20 was provided consisting of a 70 nm thick $MnO_2$ layer, a 34 nm thick $Li_2CO_3$ layer, a 40 nm thick $Ta_2O_5$ layer, and a 34 nm thick $Li_2CO_3$ layer on a substrate, corresponding to the embodiment illustrated in FIG. 5. The stack was annealed for 20 minutes at 450° C. in air, resulting in the formation of a stack of a $LiMn_2O_4$ cathode layer and a $LiTaO_3$ solid electrolyte layer.

In another experiment, a stack was provided consisting of a 100 nm thick $MnO_2$ layer, a 50 nm thick $Li_2CO_3$ layer, a 33 nm thick Ni/Ge/Ni layer, and a 50 nm thick $Li_2CO_3$ layer. After annealing for 180 minutes at 400° C. in air a stack comprising a $LiMn_2O_4$ electrode layer and a $Li_2NiGe_3O_8$ electrolyte layer with an ionic conductivity of $10^{-9}$ S/cm was obtained.

Figure 3A:
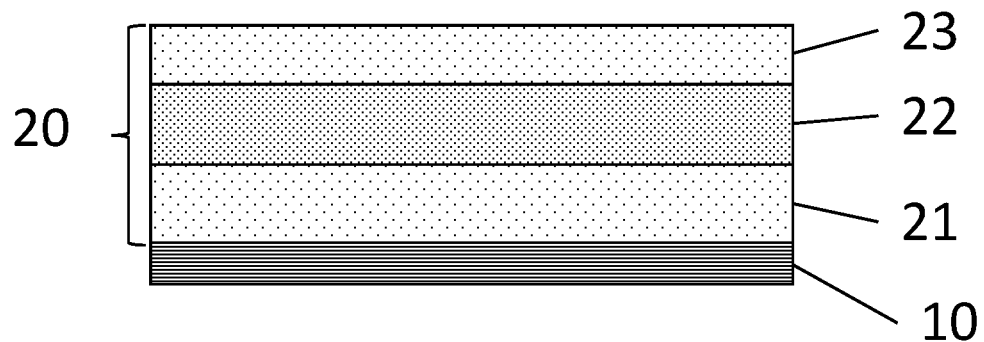
FIGS. 3a-3c and FIG. 4 schematically illustrate a method according to the present disclosure for fabricating a solid-state thin film battery cell.
Figure 3B:
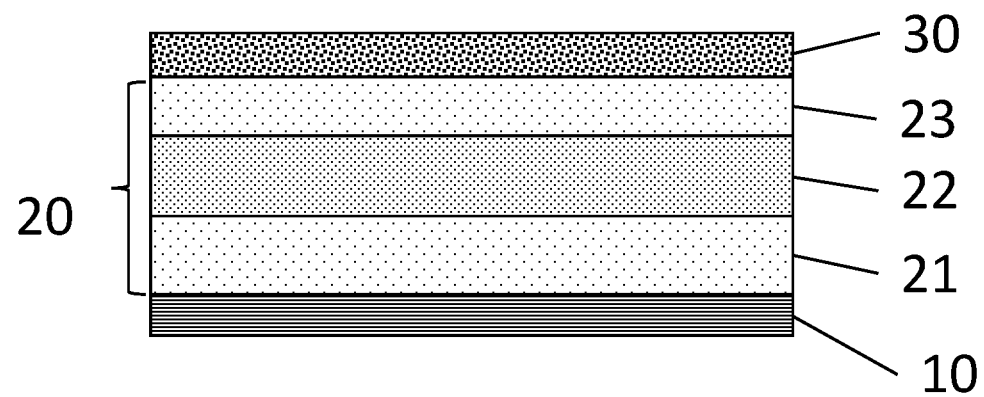
Figure 3C:
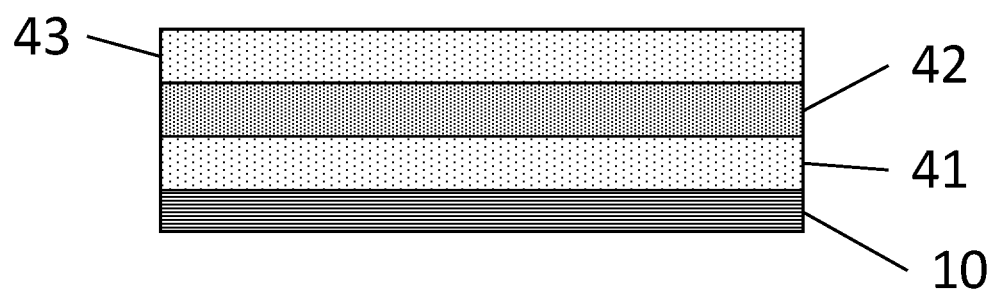
Figure 4:
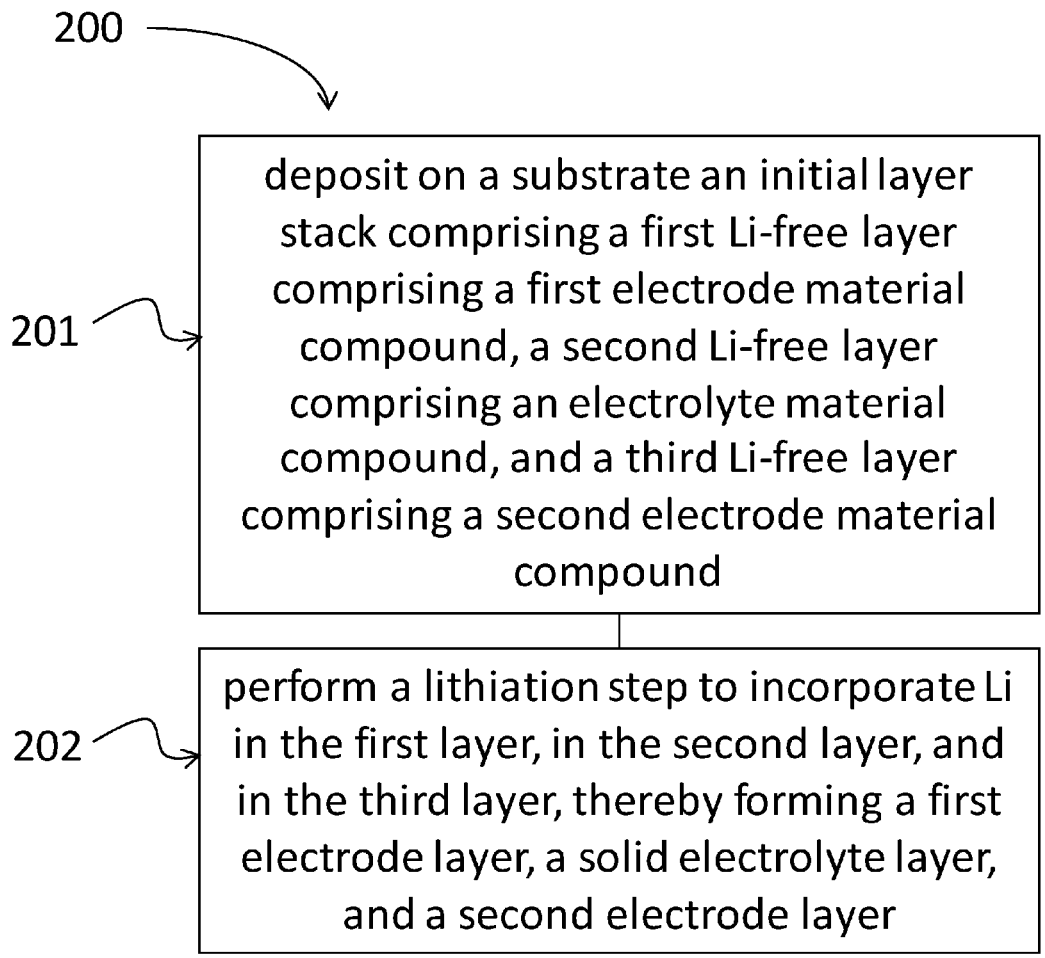

FIG. 3 and FIG. 4 schematically illustrate a method according to the present disclosure for fabricating a solid-state thin film battery cell. In the example shown in FIG. 3 the initial layer stack is a Li-free layer stack. However, the present disclosure is not limited thereto, and a layer comprising a Li compound may be incorporated in the initial layer stack.

In a method 200 of the present disclosure as illustrated in FIG. 3 and FIG. 4, first an initial layer stack 20 is deposited on a substrate 10 (FIG. 4, step 201), the initial layer stack 20 being Li-free in the example shown in FIG. 3. The Li-free initial layer stack 20 comprises a first Li-free layer 21 comprising a stack of a first electrode material compound, a second Li-free layer 22 comprising an electrolyte material compound, and a third Li-free layer 23 comprising a second electrode material compound (FIG. 3(a)). The first electrode material compound and the second electrode material compound may for example be an oxide, e.g. a metal oxide such as a titanium oxide or a manganese oxide, the present disclosure not being limited thereto. The first and second electrode material compounds preferably have a good electronic conductivity, are chemically stable, and have a negligible volume expansion during battery charging/discharging. The electrolyte material compound may for example be an oxide such as a tantalum oxide, an aluminum oxide or a silicon oxide, the present disclosure not being limited thereto. The substrate 10 may for example comprise a current collector.

The first Li-free layer 21, the second Li-free layer 22, and the third Li-free layer 23 typically have a thickness in the range between 5 nm and 250 nm, e.g. between 20 nm and 150 nm, the present disclosure not being limited thereto. The first Li-free layer 21 and/or the second Li-free layer 22 and/or the third Li-free layer 23 may be composed of different sub-layers, e.g., they may comprise a stack of different sub-layers.

The first Li-free layer 21 comprises a first electrode material compound, the first electrode material compound being a starting material for forming a first electrode layer (by lithiation) further in the fabrication process. The composition of the first Li-free layer 21 is thus different from the composition of the first electrode layer in the battery cell. Similarly, the second Li-free layer 22 comprises an electrolyte material compound, the electrolyte material compound being a starting material for forming a solid electrolyte layer (by lithiation) further in the fabrication process. The composition of the second Li-free layer 21 is thus different from the composition of the solid electrolyte layer in the battery cell. Similarly, the third Li-free layer 23 comprises a second electrode material compound, the second electrode material compound being a starting material for forming a second electrode layer (by lithiation) further in the fabrication process. The composition of the third Li-free layer 23 is thus different from the composition of the second electrode layer in the battery cell.

After providing the initial layer stack 20, a lithiation process or step 202 (FIG. 4) is performed. The lithiation step 202 comprises depositing on the Li-free layer stack 20 a layer 30 comprising a Li compound as illustrated in FIG. 3(b), and afterwards performing an annealing or thermal treatment step. The annealing step induces a solid-state reaction between the Li compound and the material compounds (such as the first electrode material compound, the electrolyte material compound, and the second electrode material compound) of the initial layer stack 20. As a result of this single thermal treatment step, a stack comprising a first electrode layer 41, a solid electrolyte layer 42 and a second electrode layer 43 is created, as schematically shown in FIG. 3(c), suitable as a battery cell for solid-state thin film battery applications. Eventually, non-reacted material of the Li compound may be rinsed off.

In an alternative approach, a layer comprising a Li compound may be incorporated in the initial layer stack 20. For example, a layer comprising a Li compound may be provided between the first Li-free layer 21 and the second Li-free layer 22 and/or between the second Li-free layer 22 and the third Li-free layer 23.

It is a potential advantage of methods according to the present disclosure that the different layers may be deposited without pinholes and with good crystallinity. Closed packed, homogeneous and conformal films can be obtained.

The deposition procedures can be optimized in order to engineer interfaces between the different layers, e.g. between an electrode layer and an electrolyte layer, to improve or enhance Li-ion conducting pathways. For example, layers with a progressive change in composition may be used to tune the interface between an electrode layer and an electrolyte layer, e.g. to compensate for a small lattice mismatch between electrolyte and electrode. Instead of having a sharp interface between the different layers, a more gradual transition between an electrode layer and an electrolyte layer may be provided. For example, a gradual transition between an LMO ($LiMn_2O_4$) electrode layer and an LMNO ($Li_2NiMn_3O_4$) electrolyte layer may be obtained by tuning, e.g. gradually changing, the Ni content in between, resulting in a smooth interface between the electrode layer and the electrolyte layer.

A method of the present disclosure may be used for fabricating all-spinel solid-state thin film batteries that may be used for different applications. Lithium manganese oxide (LMO) $LiMn_2O_4$ and lithium titanium oxide (LTO) $Li_4Ti_5O_{12}$ are positive and negative electrode materials with the spinel structure and may be used as electrode materials in batteries. Other, more complex systems may be considered, such as for example $Li_2NiGe_3O_8$, $LiMgTiO_3$, or $Li_{4-2x}Al_xSiO_4$.

Using the same approach as described above, 3D microstructure thin film configurations may be formed. Instead of using a planar substrate, a substrate comprising 3D features or 3D microstructures may be used. For example, a substrate comprising 3D silicon pillar arrays may be used to increase the substrate surface area, and hence the battery capacity.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

Whereas the above detailed description as well as the summary of the disclosure has been focused on a method for fabricating a device, the present disclosure also relates to a device obtained using a method according to any of the embodiments as described above.

While the above detailed description has shown, described, and pointed out novel features of the invention as applied to various embodiments, it will be understood that various omissions, substitutions, and changes in the form and details of the device or process illustrated may be made by those skilled in the technology without departing from the invention.

What is claimed is:

1. A method for fabricating a thin film solid-state Li-ion battery comprising a first electrode layer, a solid electrolyte layer, and a second electrode layer, the method comprising:
depositing an initial layer stack on a substrate, wherein the initial layer stack comprises a first Li-free layer comprising a first electrode material compound, and a second Li-free layer comprising an electrolyte material compound; and
after depositing the initial layer stack, performing a lithiation step, the lithiation step comprising forming a Li-compound layer on the initial layer stack or between the first and second layers to incorporate Li in the first layer and in the second layer, thereby forming a stack of a first electrode layer and a solid electrolyte layer.

2. The method according to claim 1, wherein the initial layer stack further comprises a third layer comprising a second electrode material compound, and wherein performing the lithiation step further comprises incorporating Li in the third layer, thereby forming a stack of a first electrode layer, a solid electrolyte layer, and a second electrode layer.

3. The method according to claim 1, wherein the lithiation step comprises:

depositing the layer comprising a Li compound on the initial layer stack; and after depositing the layer comprising the Li compound, performing a thermal treatment, thereby inducing a solid-state reaction between the Li compound and the material compounds of the Li-free layers of the initial layer stack.

4. The method according to claim 3, wherein the layer comprising the Li compound is a $Li_2O$ layer or a $Li_2CO_3$ layer.

5. The method according to claim 3, wherein depositing the layer comprising the Li compound comprises providing the layer by solution processing.

6. The method according to claim 1, wherein the substrate comprises a current collector.

7. The method according to claim 1, wherein the substrate is a non-planar substrate.

8. The method according to claim 7, wherein the substrate comprises a plurality of micro-pillars.

9. The method according to claim 1, wherein the initial layer stack comprises a layer comprising the Li compound between the first layer and the second layer.

10. The method according to claim 2, wherein the initial layer stack comprises a layer comprising the Li compound between the second layer and the third layer.

11. The method according to claim 1, wherein depositing the initial stack on the substrate utilizes a deposition technique including one or more of electrochemical deposition, spin coating, atomic layer deposition, or sputtering.

12. The method according to claim 5, wherein the solution processing includes spin coating.

\* \* \* \* \*